April 22, 1969    J. R. McAUSLAND    3,439,592
CONNECTOR FOR WATER STOP MATERIAL OR THE LIKE
Filed July 26, 1966
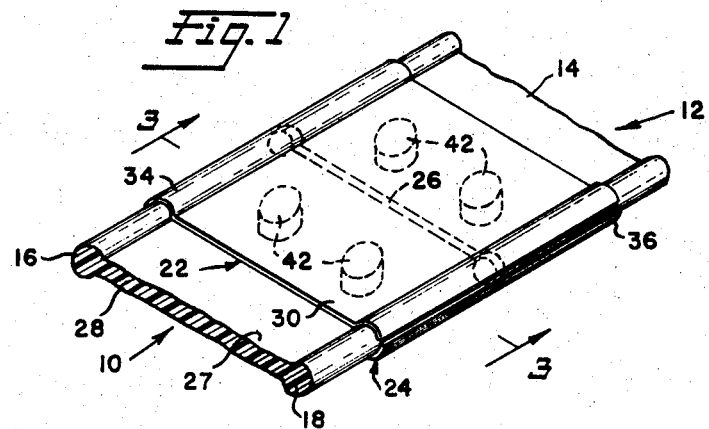
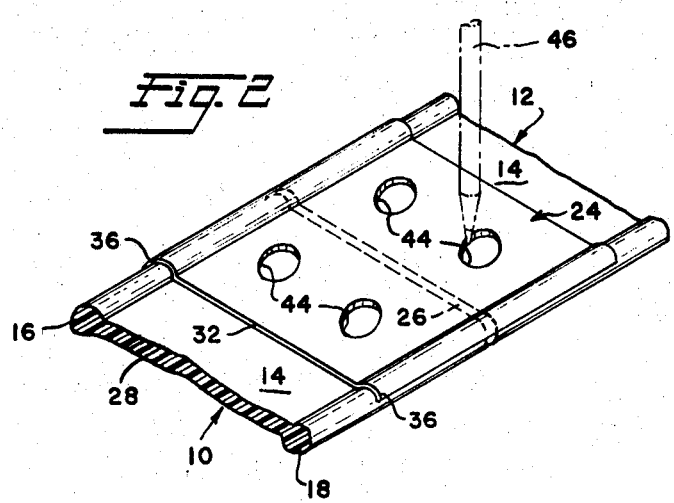
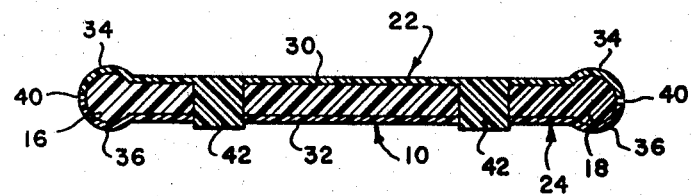
INVENTOR
JOHN R. McAUSLAND
BY
*Scrivener Parker Scrivener + Clarke*
ATTORNEYS United States Patent Office 3,439,592
Patented Apr. 22, 1969

3,439,592
CONNECTOR FOR WATER STOP MATERIAL OR THE LIKE
John R. McAusland, 222 St. Ives Drive, Severna Park, Md. 21146
Filed July 26, 1966, Ser. No. 568,064
Int. Cl. E01c *11/12;* E04f *15/14;* F16b *7/00*
U.S. Cl. 94—18    4 Claims

ABSTRACT OF THE DISCLOSURE

A connector for joining together in end-to-end relationship strips of flexible water stop material, the connectors comprising a pair of mating members adapted to sandwich the abutting ends of the strips between them across the joint, the upper member having downwardly extending bosses projecting through mating holes in the water stop material and in the lower mating member, the members and water stop material being joined together by pressure sensitive adhesive.

Detailed description

This invention relates to connectors for joining together in end-to-end relationship strips of indefinite length and more particularly to an improved connector for joining together the adjacent ends of flexible water stop material utilized for sealing joints between adjacent construction members.

Though susceptible of other applications, the present invention is particularly adapted for use in connecting together the ends of flexible, rubbery water stop material which may be of the type disclosed in the patent to Wangerow, No. 2,867,160. The water stop connector disclosed in that patent comprises a sleeve centrally divided by a transverse web to provide a pair of sockets into which the ends of the water stop material are inserted after all of the contacting surfaces of the connector and of the strips have been coated with a suitable adhesive material. The transverse web of the Wangerow patent is said to aid in maintaining the sockets open but wherever sleeve type connectors are employed the top and bottom walls almost invariably collapse upon themselves and this provides problems. For example, not only is it difficult to coat the interior of sleeves with a suitable cement, but where the sleeves have been in collapsed condition for a sufficient time to achieve a set, unless an operator is very careful after the sockets have been coated the walls thereof can collapse into each other where they are immediately almost inseparably joined together and the sleeve becomes useless. Even if the sleeve is not ruined for the above reason, cement on the interior of the sleeve and on the exterior of the water stop strip will often prevent full insertion of the strip end into the sleeve or, after the strip has been only partially inserted the adhesive will bond the parts inseparably together so that only part of the sleeve operates as a connector.

The broad object of the present invention is to provide an improved connector which overcomes the disadvantages of prior art connectors of the type described.

A more particular object of the invention is to provide a connector for connecting together in end-to-end relationship flexible rubbery strip material by the use of a pair of matching members which sandwich between them the ends of the strip material after all of the contacting surfaces have been coated with a suitable adhesive, thus avoiding all of the problems attendant upon an attempt to insert an adhesively coated end into a socket whose interior walls have also been adhesively coated.

A still more specific object of the invention is to provide a connector for connecting together the ends of flexible water stop material not only by the use of adhesively coated mating members but also by the use of mechanical elements which cooperate with the ends of the strips and also the mating elements to aid in the connection of the members.

Other objects and their attendant advantages will become apparent as the following detailed description is read in conjunction with the accompanying drawings wherein:

FIG. 1 is a broken perspective view showing the manner of use of the present invention;

FIG. 2 is similar to FIG. 1 and illustrates a step in effecting the connection of the ends of the strips of water stop material; and FIG. 3 is an enlarged vertical cross-sectional view taken substantially on the line 3—3 of FIG. 1.

Referring now to the drawings the numerals 10, 12 designate sections of water stop material of the type having a central web 14 extending transversely between enlarged side edge parts 16, 18 which may be partly circular in cross-section and are adapted to be imbedded in construction material, such as concrete on opposite sides of a joint between portions of construction material, as for example, at the transverse or longitudinal joint between sections of a concrete roadway. The water stop material illustrated is known and forms no part of the present invention, it being the function of the latter to join together in strong water tight relationship the ends of two sections of the described water stop material.

In accordance with the invention, the connector comprises upper and lower relatively flat, elongated members 22, 24, which are adapted when in their position of use to extend some distance along both water stop sections on either side of the joint 26 between the section ends. Each of the members 22, 24 has a moulded configuration conforming substantially to the contour of the upper and lower faces 27, 28 of the water stop material with each having a respective transverse web part 30, 32 and upstanding arcuate side parts 34, 36 which extend over and partly around the edge parts 16, 18 of the water stop material. The side parts 34, 36 are dimensioned with respect to the edge parts 16, 18 of the water stop material that a relatively narrow longitudinal gap 40 extends along the connector sides when the parts 22, 24 are in their position of use. By dimensioning the side parts of the connector members so that they do not touch, uniform engagement of the connector members with the surfaces of the water stop material is assured.

In accordance with the invention upper member 22 is provided with integral vertically extending bosses 42 which are disposed on the inner side of the web part 30 of the member 22 and arranged longitudinally so that an equal number of bosses are disposed on opposite sides of the dividing line 26 between the ends of the water stop material as illustrated in FIG. 1. The lower member 24 of the connector is provided with a set of preformed openings 44 which exactly match in number, size and positions the bosses 42. With this arrangement, the lower member 24 of the connector of the invention may be temporarily placed on top of the water stop strips 10, 12 as illustrated in FIG. 2 and a suitable marking instrument, such as the pencil 46, may be used to mark in template fashion the location of openings which thereafter may be formed by a suitable punching or cutting tool in the respective ends of the water stop material 10, 12. After the openings in the water stop material have been punched out, it will then be apparent that the bosses and openings in the water stop material and in the lower member 24 of the connector will all register with each other with the bosses thus serving as a mechanical means for interconnecting the ends of the water stop material.

In use, where ends of two sections of water stop material are to be connected together by the connector of the present invention, holes are first located and then formed in the ends of the material as above described. Thereafter all surfaces of the connector and of the water stop material which are to be in contact with each other are coated with any known preferably pressure-sensitive cement and the members are assembled together with the upper member being preferably first positioned with the bosses projecting through the openings which have been formed in the ends of the water stop material as above explained. The lower member 24 is then assembled onto the bosses which desirably are dimensioned to project slightly beyond the surface of the lower web part 32 of the lower connector member 24 as illustrated in FIG. 3.

From the foregoing description, it will be seen that applicant's use of a pair of separate but mating members sandwiching between them the confronting ends of strips of water stop material eliminates all of the problems associated with connecting the ends together by inserting them into closed sleeves or sockets. Furthermore, by using separate mating connector members, the parts of the connector and the water stop material can all be properly aligned before the members are brought into contact with each other, thus avoiding entirely the problems of premature bonding which can occur where two previously cemented members are brought into premature contact with each other, as those skilled in this art well recognize. In addition, by utilizing two mating members, mechanical connecting means such as the bosses 42 integral with one of the mating members may be moved down into mating openings formed into the ends of the water stop material to provide a more secure bond than would be achieved merely by cement alone. Obviously where a sleeve type connector is employed mechanical connector elements of the type set forth hereinabove could not be employed.

In addition to connecting the ends of water stop strips arranged in end-to-end relationship, the connector of the invention is equally useful for connecting two or more strips which meet at angles to each other. For example, where the end of one strip meets a second strip at right angles thereto, connector parts embodying the features of the invention would be fabricated in a T shape or in an L shape depending on whether the strips meet at their respective ends or perpendicularly along the length of one of them and where four strips meet the connector would be in the form of a cross. In like manner, strips may be arranged vertically to meet in either aligned or angular relationship. In the former case the illustrated connector would be employed but in the latter case one or more side parts would join a main part along intersecting vertical planes.

Regardless of configuration, each arm part would desirably be provided with the described boss means which would be engageable with mating openings formed on the spot in the adjacent water stop strip parts as above described, and preformed in the corresponding arms of the mating connector part.

The foregoing modifications and changes as well as others may be resorted to without, however, departing from the scope and spirit of the appended claims.

What is claimed is:

1. In combination with two strips of flexible rubbery water stop material defining a joint between said strips, a connector for the ends of said strips comprising two complementary members having a cross-sectional configuration corresponding respectively to the contours of the upper and lower faces of said strip material and engaging said faces on opposite sides of said joints, one of said members having a plurality of vertical bosses fixed to its engaging face with an equal number of said bosses being positioned on each side of said joint, said other member and said strips having registering openings therethrough corresponding in size, number and position to the bosses in said first member, said openings having said bosses received therein, and adhesive over a substantial portion of the contacting surfaces of said connector members and said strip.

2. The combination of claim 1 wherein the side edges of said connector members extend toward each other over the edges of said strips, said edges of said connector members being spaced out of contact with each other throughout the length thereof.

3. In combination with at least two strips of elongated flexible rubbery water stop material arranged with respect to each other so that the end of one strip is in close adjacency to a second strip to define a joint therebetween, connector means for said strips comprising a pair of connector members each having a cross-sectional configuration complementary with the opposed faces of said strips, respectively, said members sandwiching therebetween in contacting relationship the respective upper and lower faces of said strips across said joint, one of said connector members having on its engaging face vertically extending boss means, the other of said connector members and said strips having opening means therethrough corresponding in number, size and position to the boss means on the first member, said boss means registering with and being received in said opening means, and adhesive on the contacting faces of said connector members and said strips.

4. The combination of claim 3 wherein the side edges of said connector members extend toward each other over the edges of said strips, said edges of said connector members being spaced out of contact with each other throughout the length thereof.

References Cited

UNITED STATES PATENTS 2,867,160   1/1959   Wangerow _____ 94—18.2

FOREIGN PATENTS 1,374,180   8/1964   France.

JACOB L. NACKENOFF, *Primary Examiner.*

U.S. Cl. X.R.

52—396; 287—104